Figure 1:
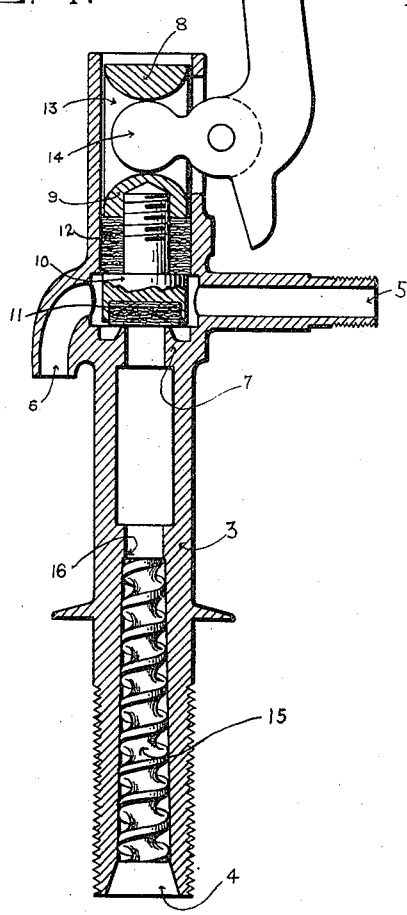

D. W. McNEIL.
SUPPLY VALVE.
APPLICATION FILED MAR. 22, 1912.

1,150,216.

Patented Aug. 17, 1915.

Witnesses

Inventor
Daniel W. McNeil
By Murray & McCallister
Attorneys

UNITED STATES PATENT OFFICE.

DANIEL W. McNEIL, OF CINCINNATI, OHIO, ASSIGNOR TO THE JOHN DOUGLAS COMPANY, OF CINCINNATI, OHIO, A CORPORATION OF OHIO.

SUPPLY-VALVE.

1,150,216.  Specification of Letters Patent.  Patented Aug. 17, 1915.

Application filed March 22, 1912. Serial No. 685,439.

*To all whom it may concern:*

Be it known that I, DANIEL W. MCNEIL, a citizen of the United States of America, and resident of Cincinnati, county of Hamilton, and State of Ohio, have invented certain new and useful Improvements in Supply-Valves, of which the following is a specification.

This invention relates to valves and particularly to flush-valves and has for an object to produce a flush-valve having improved means for restricting the flow of water passing through it and preventing the objectionable whistling encountered when the water passing through the valve is subjected to high pressure. This and other objects I attain by means of a valve embodying the features herein described, and illustrated in the drawings accompanying and forming a part of this application.

Figure 2:
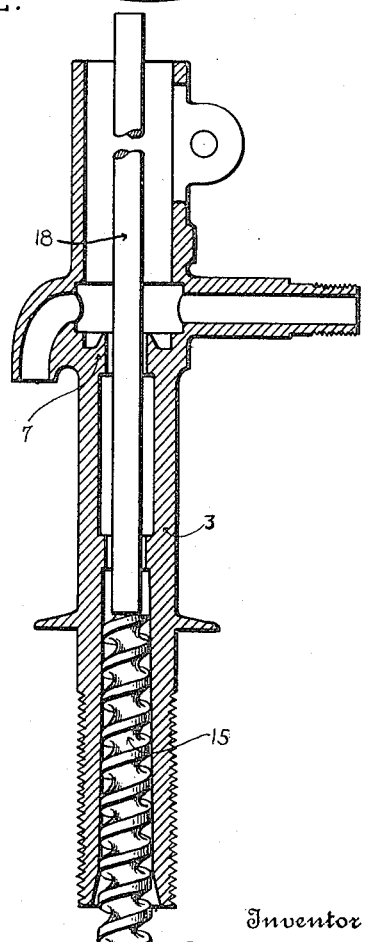

In the drawings Figure 1 is a sectional view of a float-actuated flush valve, portions being shown in elevation, and portions being broken away for convenience of illustration. Fig. 2 is a sectional elevation of a valve casing embodying my invention and illustrates the manner in which the obstructing spiral may be removed from the casing.

One of the principal features of my invention is the ease with which the valve may be converted or changed so that it may be effectively employed in connection with low, as well as high pressure distribution systems. This is accomplished by providing a worm or spiral which may be removably mounted within the casing so that it impedes the flow of water through the casing by providing a restricting and tortuous passage for it. The worm or spiral is so mounted within the casing that it may be easily and quickly removed so as to provide an unrestricted or free passage for the water through the valve when the valve is employed in connection with distribution systems subjected to low pressures.

It has been found by experience that a restricted orifice does not prevent the whistling of the water issuing from the valve when the valve is employed in connection with a high pressure distribution system; and it has also been found desirable to employ a circuitous passage for the water passing through the valve for the purpose of impeding its flow and preventing the objectionable whistling. For these reasons spirals or worm plungers have been integrally formed with the valve disk or plunger and so located within the valve casing that they present a circuitous or tortuous passage to the water when valve is open. With such an arrangement the valve is not well adapted for use in connection with low pressure distribution systems, since they cannot be so converted or changed that the water will have a free passage through them when the valve is open. Flush valves should be so adjusted that the tank will refill in about a minute's time. This requirement renders a valve, having a spiral plunger, objectionable when it is employed in connection with a low pressure distribution system since the circuitous and restricted passage, occasioned by the use of the plunger, so impedes the flow of water through the valve that the tank will be slow in refilling after it has been flushed. This difficulty is overcome in my invention by providing a separately formed worm or spiral which is removably mounted within the valve casing and is so arranged that it may be easily and quickly removed from the casing without detrimentally affecting the valve or its operation. Such a construction produces a valve which may be effectively employed in connection with high or low pressure distribution systems.

Referring to the drawings: The valve illustrated includes a casing 3 which is provided with an inlet port or passage 4 and outlet ports 5 and 6. A ported diaphragm 7 is formed within the casing and is located between the inlet and the outlet ports. A float-actuated plunger 8 is located in an extension of the casing and is adapted to close the port in the diaphragm 7 for the purpose of closing the valve. The plunger illustrated is formed in two parts, 9 and 10, which are permanently secured together and are located in alinement with each other. The part 10 carries a washer 11 which is adapted to seat upon the diaphragm 7 and close the port formed therein. The part 10 is also provided with a screw-threaded extension which is screwed into a suitably tapped hole provided in the part 9 of the plunger. Any suitable packing, such as the packing 12, is located around the extension for the purpose of packing the joint between the plunger and the valve casing. The upper part 9 of the plunger is provided with a slot 13, which extends transversely through it and which is adapted to receive the operating end of a float-actuated lever 14. The lever 14 is adapted to be pivotally mounted on the valve casing and extends through a slot provided in the casing.

The inlet passage of the valve casing 3 is elongated and is adapted to receive a separately formed spiral or worm 15 for the purpose of providing a restricted and tortuous passage for the water passing through the valve. The inlet passage is provided with a shoulder 16, against which the small end of the spiral is adapted to seat, and the portion of the passage, adapted to receive the spiral, is tapered inwardly to a greater extent than the taper of the spiral so that the spiral may be secured in place by driving it into the passage and against the shoulder 16. It will of course be understood that the worm or spiral may be varied in contour and that it may be helical in shape instead of spiral.

In Fig. 2 I have shown the manner in which the spiral 15 is removed from the valve casing 3 when it is desired to convert or change the valve so that it may be employed in connection with a low pressure distribution system. In performing this operation the plunger 8 is removed from the extension formed on the valve casing and a rod or pin 18, of any suitable shape, is inserted downwardly through the extension of the valve casing and through the port in the diaphragm 7 so that it rests upon the inner end of the spiral 15. The spiral can then be driven out of the casing by subjecting the pin or rod 18 to pressure or to the blows of a hammer. This arrangement provides a valve which may be effectively employed in connection with high pressure distribution systems and which may be quickly and easily converted so that it may be employed with low pressure distribution systems.

In accordance with the patent statutes I have illustrated and described the preferred embodiment of my invention, but I desire it to be understood that I do not limit my invention to flush valves since it may be employed with any type of valve and since various changes, modifications and substitutions may be made in the construction illustrated, without departing from the spirit and scope of my invention as set forth in the appended claims.

What I claim is:

1. A valve comprising a casing having an inlet passage, tapered throughout a portion of its length and converging in the direction of flow through the valve, an open-ended plunger valve-receiving extension axially alined with the passage and having outlet ports formed therein, and a diaphragm located between the passage and the extension and having a port axially alined with the extension and the passage, and a plunger valve removably mounted within the extension for controlling the delivery through the port in the diaphragm, in combination with a separately formed flow-impeding worm removably mounted in the tapered portion of the inlet passage.

2. A valve casing having an inlet passage converging in the direction of flow through the valve, and a tapered flow-impeding member removably forced into the tapered inlet passage.

3. A valve comprising a casing having an inlet passage converging throughout a portion of its length in the direction of flow through the valve, an open-ended extension axially alined with the passage, and a ported diaphragm between the passage and the extension, and a valve for controlling delivery through the port in the diaphragm, in combination with a separately formed tapered flow-impeding worm, removably mounted in the tapered portion of the passage.

4. A valve comprising a casing having a converging liquid passage formed therein, an open-ended valve-receiving extension alined with the passage and a ported diaphragm between the extension and the passage, and a valve located within the extension for controlling delivery through the port of the diaphragm, in combination with a member removably mounted within the passage and coöperating with the walls thereof to form a circuitous converging passage for liquid therethrough.

5. In combination with a valve and its casing, a separately formed converging flow-impeding member located within a passage of the casing and coöperating with the walls thereof to form a substantially helical and converging flow-impeding passage therethrough.

DANIEL W. McNEIL.

Witnesses:
RALPH H. INOTT,
WALTER F. MURRAY.